United States Patent [19]

Ikeda et al.

[11] Patent Number: 5,307,333

[45] Date of Patent: Apr. 26, 1994

[54] TRACK SERVO PULL-IN METHOD AND APPARATUS FOR AN OPTICAL DISC

[75] Inventors: Fumiaki Ikeda, Odawara; Atsushi Saito, Ichikawa; Takuya Mizokami, Odawara, all of Japan

[73] Assignee: Hitachi, Ltd., Tokyo, Japan

[21] Appl. No.: 757,940

[22] Filed: Sep. 12, 1991

[30] Foreign Application Priority Data

Sep. 18, 1990 [JP] Japan .................. 2-246076

[51] Int. Cl.⁵ ............................................. G11B 7/085
[52] U.S. Cl. ..................... 369/44.280; 369/44.250; 369/44.340; 369/44.360
[58] Field of Search ............ 369/44.36, 44.37, 44.28, 369/44.34, 44.25, 44.26, 44.32, 32, 54, 58, 48

[56] References Cited

U.S. PATENT DOCUMENTS 4,785,439 11/1988 Okada et al. ............... 369/44.28
5,056,074 10/1991 Toteishi et al. .............. 369/44.28

FOREIGN PATENT DOCUMENTS 58-91536 5/1983 Japan .
58-169370 10/1983 Japan .

Primary Examiner—W. R. Young
Assistant Examiner—Muhammad N. Edun
Attorney, Agent, or Firm—Fay, Sharpe, Beall, Fagan, Minnich & McKee

[57] ABSTRACT

An optical information memory apparatus in which after a coarse seeking operation to position an optical head to a position near a seeking target address at a high speed has been executed, only at a time point when a light spot has reached a predetermined region from the center of a track near a seeking target address, the pull-in control of the light spot to the track center is executed. The optical information memory apparatus has: a zero-cross pulse generator for receiving a tracking error signal and for producing tracking error zero-cross pulses; and a window comparator for receiving the tracking error signal and for producing tracking error window pulses which are obtained by slicing the tracking error signal by predetermined binary slice levels of an upper limit and a lower limit. Further, at a time point when a period of time of the low level of the tracking error zero-cross pulse is equal to or larger than a predetermined time interval $T_0$ and the tracking error window pulse has been set to the low level, the tracking control to pull the light spot into the track near the desired seeking target address is executed.

3 Claims, 5 Drawing Sheets

TRACK SERVO PULL-IN METHOD AND APPARATUS FOR AN OPTICAL DISC

BACKGROUND OF THE INVENTION

The invention relates to an optical information memory apparatus and its control method and, more particularly, to an optical information memory apparatus and its control method for improving the reliability of a seeking system upon fine seeking of an optical information memory apparatus of the two-stage seeking system type.

In an optical disc apparatus, as one of the seeking systems for moving a light spot for recording and reproducing on and from a target track, the two-stage seeking system comprising a combination of a coarse seeking system and a fine seeking system has been known.

As examples of the above two-stage seeking system, there have been known systems disclosed in JP-A-58-169370 and JP-A-58-91536.

According to the above seeking system, an optical head is first moved to a position near a target track at a high speed by using a coarse actuator, a light spot is settled to a proper track near the target track to be sought, a jumping operation is subsequently repeated track-by-track a fine actuator such as a galvano mirror or the like mounted onto the optical head, and the light spot is finally positioned to the target track.

According to the two-stage seeking system, a coarse actuator comprising an optical linear scale (a scale pitch is an integer times as large as a track pitch) is used as a position detector of the optical head and the optical head is positioned (coarse seeking) to a location near the target track at a high speed by an output of the linear scale. After that, the light spot is brought to a track near the target track after waiting for a state in which the light spot is settled, that is, a decentering speed of the track for the light spot (that is, an oscillating speed when the track is relatively oscillated in the disc radial direction in a sine manner for the light spot due to an eccentricity of the track of an optical disc by using one rotation of the optical disc as a period) is sufficiently delayed, a track address is read, and the jumping operation of the light spot track-by-track is subsequently executed, thereby moving (fine seeking) the light spot to the target track.

The above conventional two-stage seeking system will now be described with reference to FIG. 1, showing an operation sequence, and FIGS. 2 and 3, showing arrangement diagrams of pits on an optical disc.

As shown in FIG. 1, when a coarse seeking instruction signal 5 is first turned on, the optical head starts to move toward a target address to be sought. In the above case, a movement distance of the optical head is calculated by a linear scale position signal 2. A moving speed of the optical head is detected by differentiating the signal 2. A speed control of the optical head is executed on the basis of the results of the movement distance and the moving speed.

When the optical head moves to a position near a target point in a track detecting accuracy range of the linear scale and the moving speed becomes sufficiently small, the coarse seeking instruction signal 5 is turned off and the speed control of the optical head is finished. At the same time, a coarse positioning control instruction signal 6 is turned on and the optical head is coarsely positioned by the linear scale position signal 2. At that time, in order to detect that a track decentering speed for the light spot has decreased to a predetermined value or less just after the start of the coarse positioning control, a tracking error zero-cross pulse 4 whose level is inverted each time a tracking error signal 3 zero-crosses (namely, each time the light spot transverses the track) is generated.

A continuation time T of a low- or high-level state of the pulse 4 is monitored. If it is detected that the continuation time T has exceeded a predetermined time $T_0$ by a state in which the decentering speed had been reduced to a small enough value, the coarse positioning control instruction signal 6 is turned off and a tracking control instruction signal 7 is simultaneously turned on. To read a track address near the target point to be sought at that time, the operation for allowing the light spot to once follow the center of the track near the target point to be sought is started. After that, the light spot is jumped every track as mentioned above, thereby executing the fine seeking operation to move the light spot to the target track to be sought.

According to the above conventional two-stage seeking system, it is unclear at which position in the radial direction for the track center near the seeking target point the light spot exists at a time point when the tracking control instruction signal 7 is turned on.

As shown in FIG. 2, now assuming that a recording pit 8 is located symmetrically with respect to the right and left directions for the track center, and the tracking error signal 3 (for a deviation state of the light spot to the track center, since a state of the reflected light including irregular reflections by grooves on both sides of the track becomes unbalanced in accordance with the deviation amount, such a deviation amount can be detected by a pair of right and left detectors for detecting such an unbalanced state) is symmetrical with respect to the positive and negative polarities and no offset occurs, even if the tracking control operation has been turned on at a point A which is fairly distant from the track center, the light spot is subjected to the acceleration which is proportional to a magnitude of the tracking error signal 3 from the point A, so that the light spot is accelerated toward a target point B serving as a track center and passes the target point B. After the light spot passes the point B, the polarity of the tracking error signal 3 is changed to the negative polarity, so that the light spot is subjected to the acceleration in the direction opposite to the moving direction and is returned to the target point B. Finally, the light spot is settled to the target point B. A desired track pull-in is thus accomplished.

As shown in FIG. 3, in the case where the recording pit 8 is deviated in the radial direction of the optical disc from the track center and is located, amplitudes Pu and PL in the positive and negative directions of the tracking error signal 3 are asymmetrical with respect to the positive and negative polarities (Pu > PL). This is because the tracking error signal shown in FIG. 2 is further deviated to either one of the positive and negative directions by an influence such that when the recording pit is deviated from the track center, a groove between tracks is destroyed as shown at 8a in FIG. 3, so that the grooves on both sides of the track become asymmetrical with respect to the right and left positions or the like. In the case where the tracking error signal 3 is asymmetrical with respect to the positive and negative polarities as mentioned above, when the tracking control operation is turned on at a point C which is fairly away from the track center, the light spot is subjected to the acceleration which is proportional to the positive amplitude Pu of the tracking error signal 3 and is accelerated. After the light spot passes the peak in the positive direction, it passes the target point B.

After the light spot passes the target point B, the light spot is subjected to the acceleration such as to be returned in the direction of the target point B due to the negative polarity of the tracking error signal 3. However, the amplitude PL of the valley in the negative direction is smaller than the amplitude Pu of the peak in the positive direction because of the offset in the positive/negative directions of the tracking error signal 3, so that kinetic energy for allowing the light spot to be away from the target point B is larger than the energy to return the light spot toward the target point B. Consequently, the light spot is also continuously accelerated in the same direction by the offset after that, so that the pull-in for the tracking control cannot be performed.

SUMMARY OF THE INVENTION

As described above, the conventional two-stage seeking system has a problem such that when the offset in the positive/negative directions of the tracking error signal 3 is large, the pull-in of the tracking control of the light spot is impossible.

It is, therefore, an object of the invention to provide a two-stage seeking system which can certainly pull a light spot into the tracking control even when an offset in the positive/negative direction of a tracking error signal is large.

The system of the invention is similar to the conventional two-stage seeking system with respect to a point that the apparatus waits for a state in which the light spot is pulled into the tracking control until the decentering speed for the light spot of the track decreases and the relative speed for the track of the light spot decreases. In addition to the above point, the invention accomplishes the above object by stably and certainly performing the pull-in by limiting the pull-in position of the light spot into the tracking control, that is, by limiting the light spot to only the position at which the pull-in can be easily executed by avoiding a position at which it is difficult to perform the pull-in because it is remote from a target point (track center).

The operation based on the above construction will now be described.

First, by waiting for a reduction of the decentering speed of the track before the light spot is pulled into the tracking control in a manner similar to the conventional system, a relative speed of the light spot to the track is reduced, thereby enabling the light spot to be easily pulled into the track center. According to the invention, subsequently, the pull-in position of the light spot to the tracking control is limited to only a predetermined position at which the pull-in can be easily executed and the pull-in is performed. Thus, for instance, even when the offset in the positive/negative direction of the tracking error signal is large, the light spot can be stably and certainly pulled into the track center.

DESCRIPTION OF THE PREFERRED EMBODIMENT

An embodiment of the invention will be described in detail hereinbelow with reference to the drawings.

Figure 4:
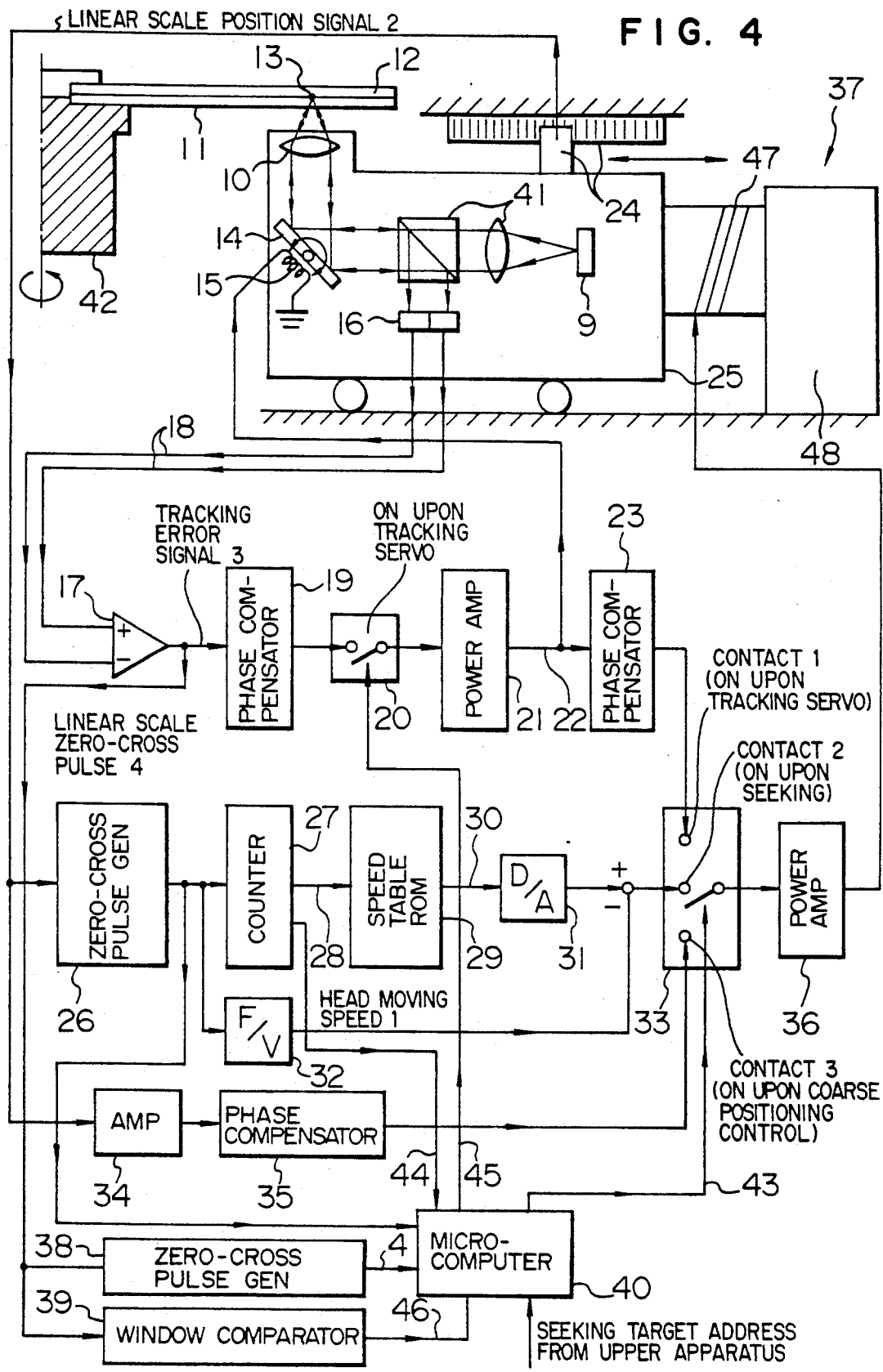
FIG. 4 is a constructional diagram showing an embodiment of an optical information memory apparatus including a seeking system and a tracking servo system.

FIG. 4 shows an embodiment of an optical information memory apparatus according to the invention. The apparatus has a seeking system to drive an optical head and a tracking control system to drive a Galvano mirror as shown in a block diagram.

In FIG. 4, reference numeral 9 denotes a laser light source; 10 an objective lens for converging a laser beam; 11 a disc-shaped optical recording medium (optical disc); 12 a recording film formed on the optical disc 11; 13 a light spot irradiated onto the optical disc 11; 14 a tracking mirror for deflecting the laser beam and for moving the position of the light spot 13 in the radial direction of the optical disc 11; 15 a mirror actuator to drive the tracking mirror 14; 16 a tracking error detector to detect a deviation of the light spot 13 from the track center; 17 a subtracter for executing a subtraction between two tracking error detection signals 18 obtained from the tracking error detector 16 and for generating the tracking error signal 3; 19 a phase compensator for receiving the tracking error signal 3 and for improving phase characteristics of the tracking control (hereinafter, referred to as a "tracking servo") system; 20 an analog switch which is turned on when the tracking servo operation is executed; 21 a power amplifier for amplifying an output signal of the analog switch 20 and for supplying a driving signal to the mirror actuator 15; 23 a phase compensator for improving coarse servo control phase characteristics of an optical head actuator driving signal so as to follow a large-amplitude and low-frequency component of a track eccentricity upon tracking servo; 24 a linear scale for detecting a position in the track direction of an optical head 25 and for generating the linear scale position signal 2; 26 a zero-cross pulse generator for zero-slicing the linear scale position signal 2 and for generating linear scale zero-cross pulses; 27 a counter for counting the linear scale zero-cross pulses 4 and for generating a movement distance signal 28 for the optical head 25; 29 a speed table ROM to obtain a corresponding speed instruction value 30 from the movement distance signal 28; 31 a digital-/analog (D/A) converter to convert the speed instruction value 30 into an analog signal; 32 a frequency/voltage (F/V) converter for converting the linear scale zero-cross pulses into a voltage and for generating the moving speed signal 1 of the optical head 25; 34 an amplifier to amplify the linear scale position signal 2; 35 a phase compensator to improve phase characteristics of an output signal of the amplifier 34; 33 an analog switch having three contacts 1 to 3; 36 a power amplifier for generating a driving signal of a head actuator 37 comprising a movable coil portion 47 and a fixed magnet portion 48; 38 a zero-cross pulse generator for zero-slicing the tracking error signal 3 and for generating the tracking error zero-cross pulses 4; 39 a window comparator for slicing the tracking error signal 3 by predetermined upper-limit and lower-limit binary levels and for generating tracking error window pulses 46; 40 a microcomputer for integratedly controlling the operations of the seeking system and tracking servo system; 41 an optical system of a lens, a half mirror, and the like provided in the optical head 25; and 42 a spindle to rotate the optical disc 11.

In the above structure, the contacts 1 to 3 of the analog switch 33 are switched and connected to movable contacts 33 upon coarse seeking, coarse positioning, and tracking servo (fine seeking), respectively.

Figure 5:
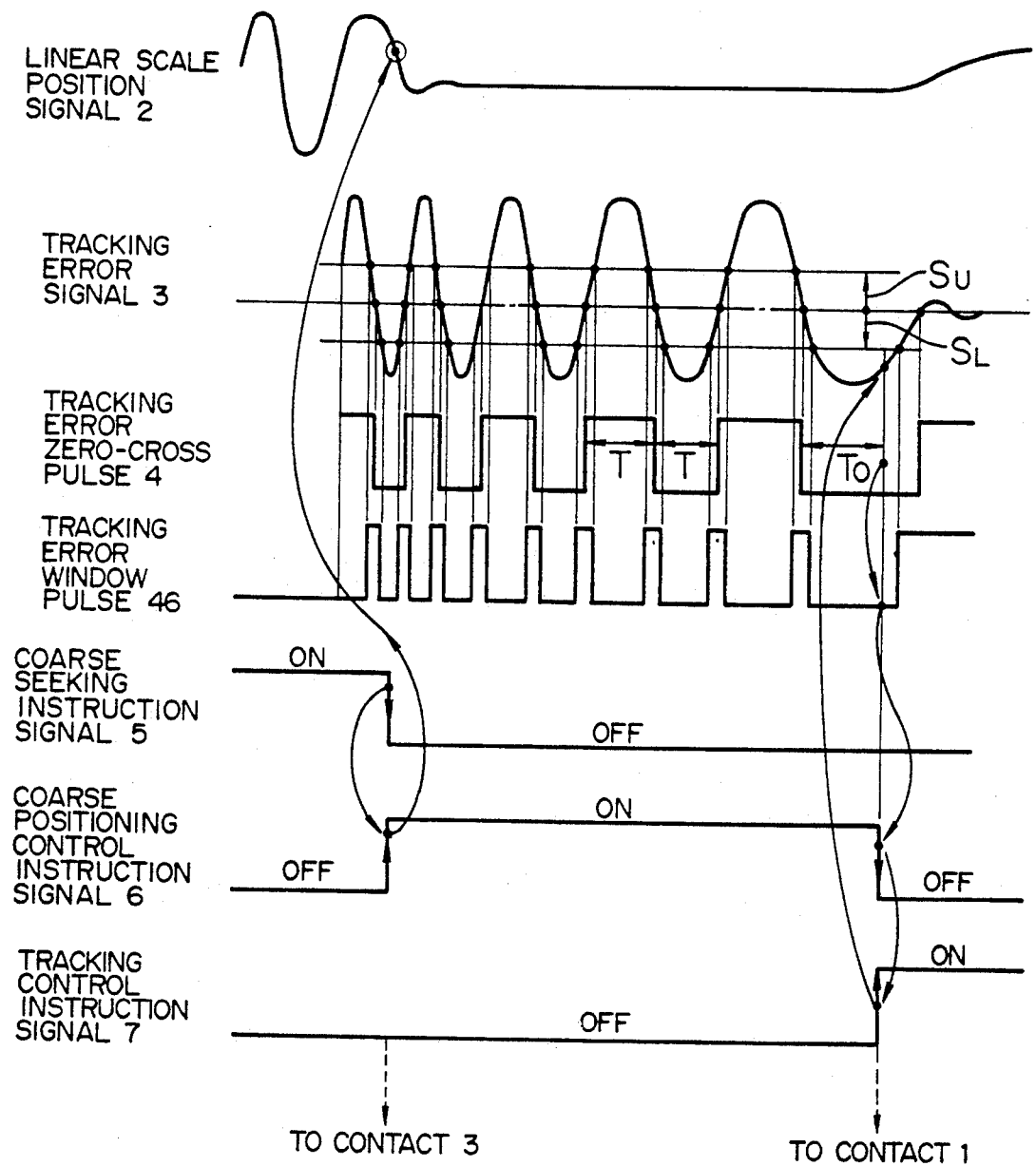
FIG. 5 is an operation sequence diagram for a two-stage seeking system of the invention.

The operation of the embodiment will now be described with reference to the operation sequence diagrams of FIGS. 1 and 5 and the pit arrangement diagrams of FIGS. 2 and 3.

Figure 1:
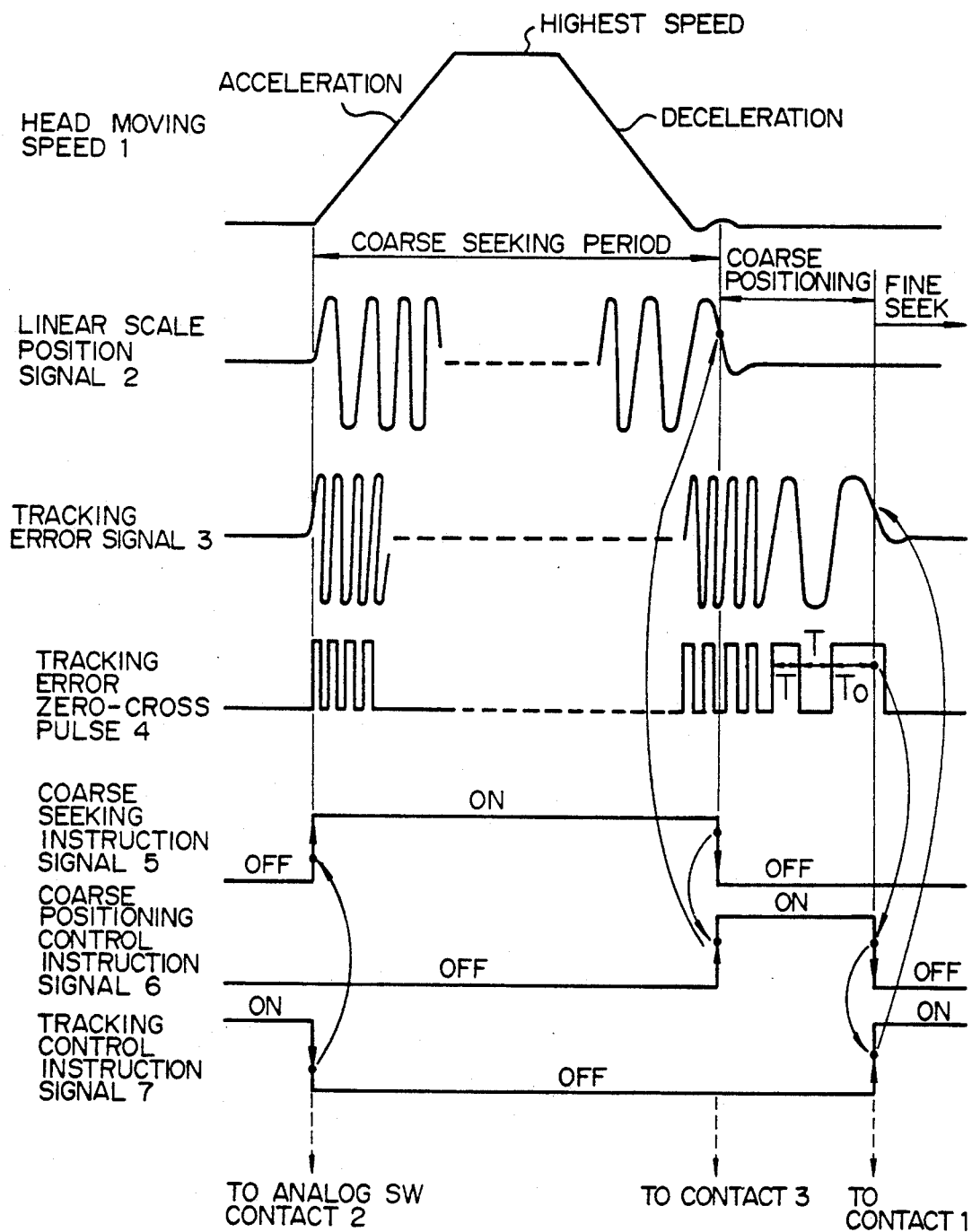
FIG. 1 is an operation sequence diagram for a conventional two-stage seeking system.
Figure 2:
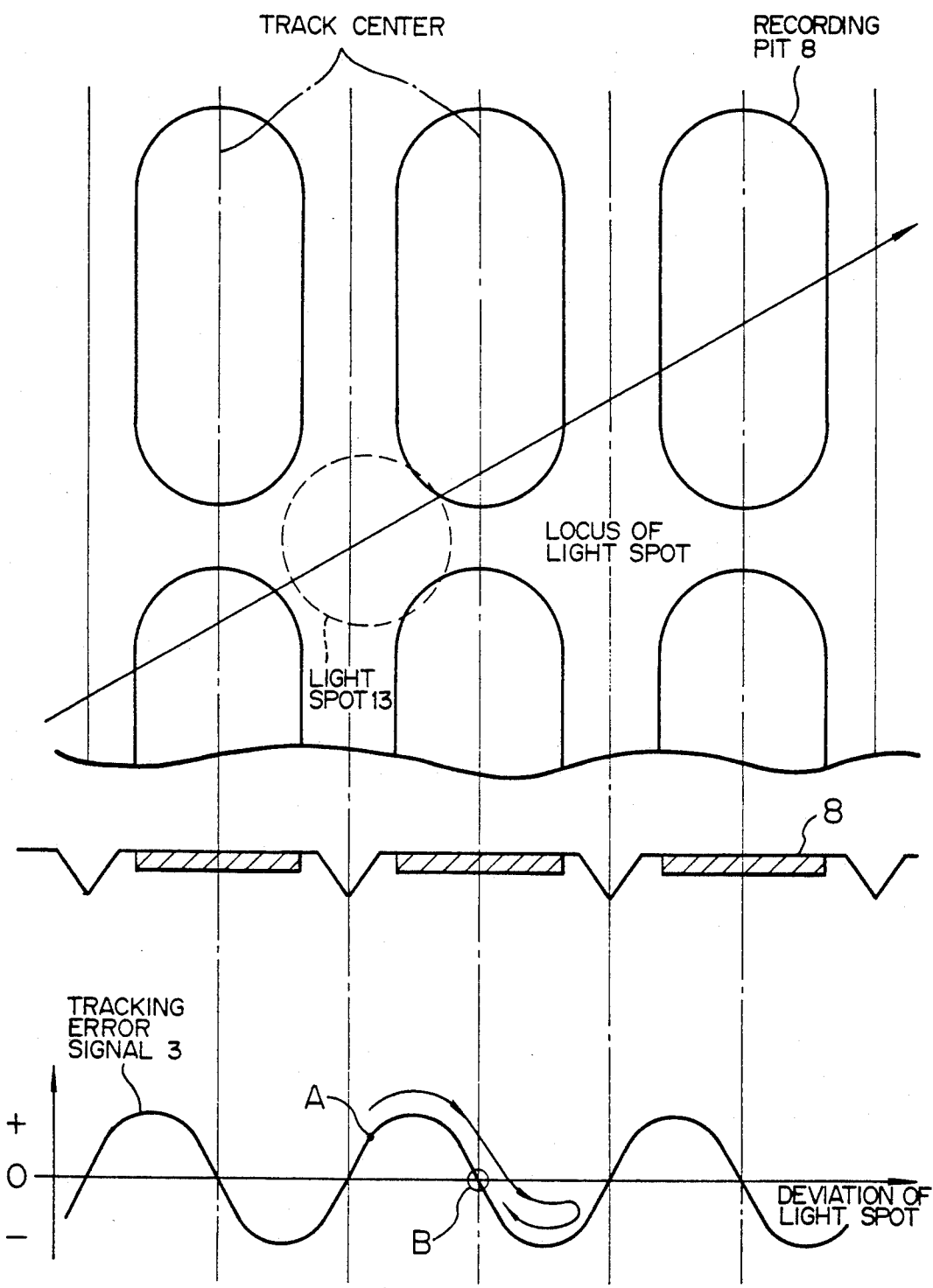
FIG. 2 is a pit arrangement diagram on an optical disc in the case where no offset exists.

FIG. 1 shows the operation sequence in the conventional two-stage seeking system. FIG. 5 shows the operation sequence of the embodiment. However, both of the above systems execute the same operation sequence for a period of time until the speed control (coarse seeking) of the optical head is finished and the coarse positioning control is started, so that the operation sequence for such a period of time is omitted from FIG. 5.

First, at the start of the seeking operation in which a seeking target address from an upper apparatus is supplied to the microcomputer 40, the microcomputer 40 gives a tracking servo off signal to the analog switch 20 through a control line 45, thereby turning off the analog switch 20. The microcomputer 40 turns off the tracking control instruction signal 7 which has been supplied so far to the analog switch 33 through a control line 43 and supplies the coarse seeking instruction signal 5 to the analog switch 33, thereby switching and connecting the movable contact from the contact 1 to the contact 2 and turning off the transmission of the tracking control signal which has been applied to the contact 1 from the phase compensator 23 and also turning on the transmission of the coarse seeking control signal which is supplied to the contact 2. By the above switching operation, a moving speed 1 of the optical head 25 is gradually accelerated as shown in FIG. 1. When the moving speed reaches the highest speed (the highest speed is determined by a value which is obtained by feeding back a head moving speed signal detected by the F/V converter 32 to a speed curve as a reference value stored in the speed table ROM 29) and the optical head, 25 moves by a predetermined distance at a constant velocity, the optical head gradually being decelerated toward a predetermined seeking target address after that. The speed control as mentioned above is executed.

When the optical head 25 reaches a position near the seeking target point, a coarse seeking end signal is sent from the counter 27 to the microcomputer 40 through a control line 44. In response to the coarse seeking end signal, the microcomputer 40 sends the coarse positioning control instruction signal 6 to the control line 43 and turns off the coarse seeking instruction signal 5. The microcomputer 40 switches the movable contact of the analog switch 33 from the contact 2 to the contact 3 and turns off the transmission of the coarse seeking control signal and turns on the transmission of the coarse positioning control signal from the phase compensator 35. As mentioned above, the optical head 25 is coarsely positioned by the coarse positioning control signal obtained from the linear scale position signal 2 as shown in FIG. 1. For a period of time of the above coarse positioning operation, the zero-cross pulse generator 38 which receives the tracking error signal 3 generates the tracking error zero-cross pulses 4, and the continuation time T of the low or high level of the tracking error signal 3 is counted. When the decentering speed of the track to the light spot decreases, and the relative speed between the light spot 13 and the track decreases, and the count value of the continuation time T reaches the predetermined value $T_0$, the pull-in of the light spot 13 into the tracking servo control is thereafter executed.

In the conventional two-stage seeking system, as shown in FIG. 1, the movable contact of the analog switch 33 is immediately switched from the contact 3 to the contact 1 and the track servo control is started to thereby pull the light spot 13 into the track. However, as shown in FIG. 3, if the recording pit 8 is deviated in the radial direction from the track center and is located, an offset which is asymmetrical with respect to the upper and lower positions occurs in the tracking error signal 3. If the pull-in operation is started from the point C which is fairly distant from the center of the track locating near the seeking target point in the above state, the pull-in of the light spot 13 into the track is failed because there is a large difference between the positive and negative amplitudes Pu and PL of the tracking error signal 3 as already mentioned above.

The position at which the track pull-in succeeds and the position at which the track pull-in fails, in the case where an offset which is asymmetrical with respect to the upper and lower positions exists in the tracking error signal 3, will now be described with reference to FIG. 3.

Consideration will now be made with regard to the case where the light spot 13 is transversing the surface of the optical disc 11 from the left side to the right side in the diagram and the tracking servo control is turned on at an arbitrary position on one pitch in a range from a point F to a point B of the tracking error signal 3, so that the pull-in of the light spot into the track is executed.

(1) In the case of turning on the tracking servo at an arbitrary position in a range from the point F to a point E, the polarity of the tracking error signal 3 is negative. The light spot 13 is applied with a force such as to return the light spot 13 in the direction (right→left) opposite to the moving direction (left→right), so that the light spot 13 is decelerated and the moving speed of the light spot is set to 0 before the light spot reaches a point G. The light spot is subsequently accelerated in the opposite direction (right→left) from the point G, and is finally returned in the opposite direction, pulled into the point F as a track center, and settled.

(2) In the case of turning on the tracking servo at an arbitrary position in a range from the point E to the point G, in a manner similar to the case of the above item (1), the polarity of the tracking error signal 3 is negative, and the force in the direction (right→left) opposite to the moving direction (left→right) is applied to the light spot 13, so that the light spot 13 is decelerated. However, the light spot is not sufficiently decelerated until it reaches the point G, so that the light spot 13 passes the point G. After the light spot passed the point G, the polarity of the signal 3 is changed to the positive polarity and the force in the moving direction (left→right) is applied to the light spot 13, so that the light spot 13 is continuously accelerated and passes the point B at a high speed.

Since the signal 3 is set to the negative polarity after that, the light spot 13 is decelerated. Since the amplitude PL in the negative direction is small due to the offset of the signal 3, however, the light spot 13 easily rides over the valley and also further passes a point H. As mentioned above, although the acceleration and deceleration of the light spot 13 are repetitively performed, the light spot is not settled to a predetermined track center point and the pull-in to the track is impossible.

(3) In the case of turning on the tracking servo at an arbitrary position in a range from the point G to the point D, the tracking error signal 3 is set to the positive polarity and the light spot is fairly away from the target point B as a center point of the track locating at the nearest position at that time point, so that the light spot 13 is continuously accelerated and passes the point B at a high speed. After that as well, in a manner similar to the case of the above item (2), the light spot 13 is not sufficiently decelerated in a range of the negative polarity of the signal 3 but passes the point H, so that the pull-in to the track is impossible.

(4) In the case of turning on the tracking servo at an arbitrary position in a range from the point D to the point B, in a manner similar to the case of the above item (3), the tracking error signal 3 is set to the positive polarity. However, since the light spot is closer to the point B than the case of the above item (3), a period of time when the light spot 13 is accelerated decreases. The light spot passes the point B at a speed lower than that in the case of the above item (3). After that, since the light spot is sufficiently decelerated by the negative polarity of the signal 3 and the moving speed is set to 0 before the light spot reaches the point H, the light spot 13 subsequently starts to move in the opposite direction (right→left) and is finally pulled into the point B and is settled.

From the above viewpoint, it has also been confirmed from the experiments that even in the case where the track center does not coincide with the pit center, as shown in an example of FIG. 4, and the offset which is asymmetrical with respect to the upper and lower positions exists in the tracking error signal 3, a range where the pull-in of the light spot 13 succeeds lies within a range from the point F to the point E and a range from the point D to the point B, and a range where the pull-in fails lies within a range from the point E to the point D.

It is, therefore, sufficient to execute the tracking servo for a period of time while avoding the period of time from the point E to the point D. In this embodiment, in consideration of both the ease and the costs of the circuit construction, the tracking error signal 3 is sliced on the basis of the positive level Su which passes the point D and the negative level SL which passes the point E, and the tracking servo is turned on for a period of time excluding the period of time between the points sliced by the slice levels Su and SL.

Figure 3:
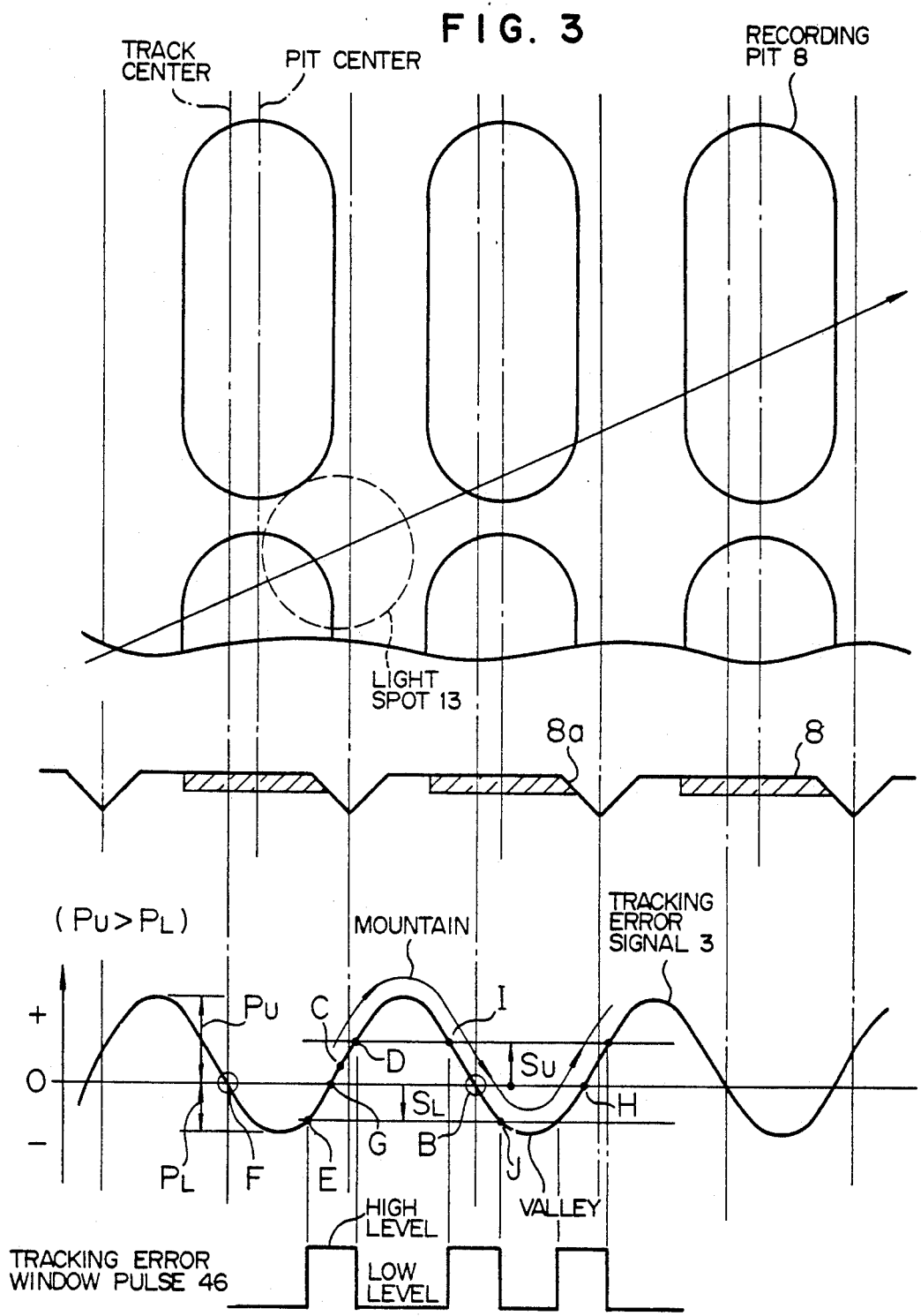
FIG. 3 is a pit arrangement diagram on the optical disc in the case where an offset exists.

That is, as shown in FIG. 3, the tracking error window pulse 46 which is set to the high level when the tracking error signal 3 exists in a range between the same slice levels Su and SL which have been experimentally determined and which is set to the low level in the periods other than such a range is generated. The tracking servo is turned on when the pulse 46 is at the low level. The slice levels Su and SL are set as circuit constants of the window comparator. In the above case, a period of time from a point I to a point J of the signal 3 corresponds to the region where the track pull-in succeeds. However, no problem occurs in the operation even if such a region is purposely avoided.

Returning to FIG. 5 showing the characteristic portion of the embodiment, as the relative speed between the light spot 13 and the track decreases, the continuation time T of the tracking error zero-cross pulses 4 gradually increases and finally reaches the predetermined value $T_0$. At that time point, if the microcomputer 40 has confirmed that the tracking error window pulse 46 generated from the window comparator 39 has already been set to the low level or that the window pulse 46 has been set to the low level due to the time waiting, the microcomputer 40 turns off the coarse positioning control instruction signal which is supplied to the analog switch 33 through the control line 43, thereby disconnecting the contact 3 of the analog switch 33. Subsequently, the microcomputer 40 turns on the tracking control instruction signal 7 which is sent to the analog switch 33 through the control line 43 and connecting the contact 1 of the analog switch 33, thereby starting the tracking control.

In this embodiment, the window comparator in which the same slice level had been set in the positive and negative directions has been used. However, it is also possible to use a window comparator having slice levels which are different in the vertical direction so long as a peak and a valley of the tracking error signal 3 can be sliced by only a predetermined amount, respectively.

Further, from a viewpoint of the circuit construction, it is also possible to use the window comparator 39 which is constructed so as to form the tracking error window pulse 46 which is set to the high level for only an interval from the point E to the point D in a range from the point F to the point B indicative of one period between the centers of the adjacent tracks of the tracking error signal shown in FIG. 3.

As described above, according to the embodiment, even in the case where a large offset which is asymmetrical with respect to the upper and lower positions exists in the tracking error signal 3, the operation to pull-in and follow the light spot 13 to the track after completion of the coarse seeking operation can be stably and certainly performed. Thus, a seeking servo system of high reliability can be realized cheaply by a simple method.

We claim:

1. An optical information memory apparatus comprising:
    a head section for accessing an optical information recording medium by a light spot, for generating a tracking error signal which is obtained when said light spot traverses tracks recorded on the optical information recording medium, and for generating a linear scale position signal indicative of a relative position to a predetermined external linear scale; and
    a control section having a zero-cross pulse generator for receiving the tracking error signal and for producing tracking error zero-cross pulses, and a window comparator for receiving the racking error signal and for producing tracking error window pulses which are obtained by slicing the tracking error signal by predetermined binary slice levels of an upper limit and a lower limit, said control section executing a coarse seeking control to move the light spot to a position near a desired seeking target address on the optical information recording medium on the basis of the linear scale position signal generated from the head section, wherein at a time point when a period of time of the low level of the tracking error zero-cross pulse is equal to or larger than a predetermined time interval $T_0$ and the tracking error window pulse has been set to the low level, a tracking control to pull the light spot into the track near the desired seeking target address is executed.

2. An apparatus according to claim 1, wherein said binary slice levels of the window comparator are slice levels having predetermined same values in both the positive and negative directions, and the tracking error signal is sliced by said same slice level, thereby producing the tracking error window pulses.

3. A control method of an optical disc apparatus of a two-stage seeking system for executing a seeking operation to position a recording/reproducing light spot to a seeking target track on an optical disc in a manner such that a coarse seeking operation for positioning an optical head to a position near the seeking target track at a high speed is performed by a coarse actuator using an external linear scale as a position detector and, after that, a fine seeking operation to once follow a light spot to a track near the seeking target track and to read an address after waiting for the settlement of the light spot and to move the light spot to the target track by a jumping operation every track, comprising the steps of:

executing a coarse positioning control until a decentering speed of the track to the light spot decreases to a predetermined value after completion of the coarse seeking operation; and pulling the light spot into the tracking control to the track near the seeking target track at a time point when a tracking error zero-cross pulse stays low for a predetermined time period, wherein said zero-cross pulse is obtained by slicing the tracking error signal by predetermined binary levels of an upper limit and a lower limit.

* * * * *